June 8, 1943. S. P. WAGONER 2,321,533
DRILL CHUCK
Filed Sept. 17, 1941
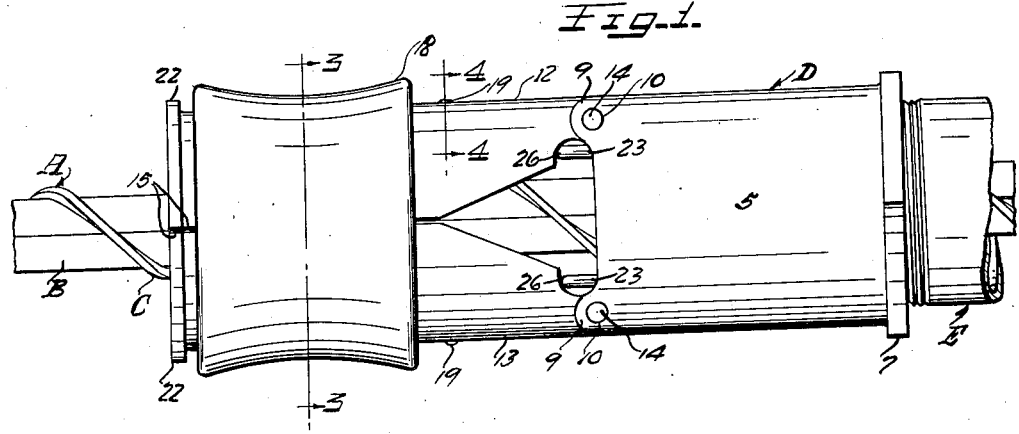
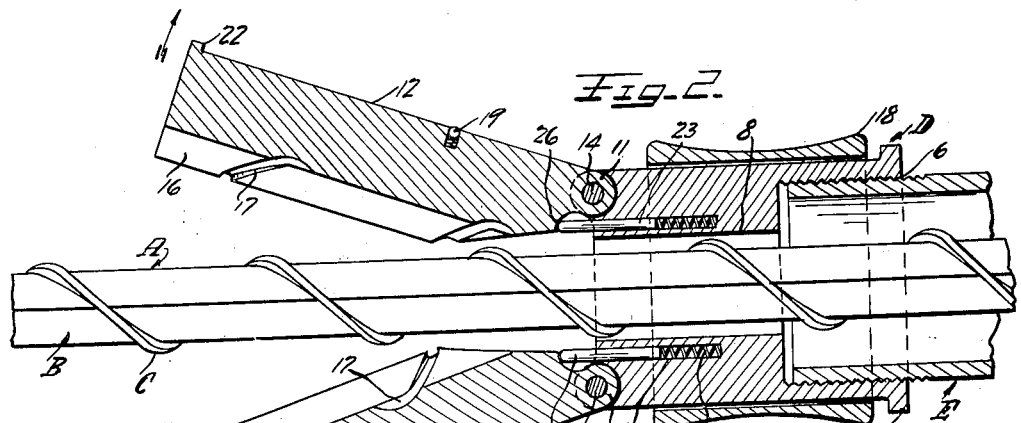
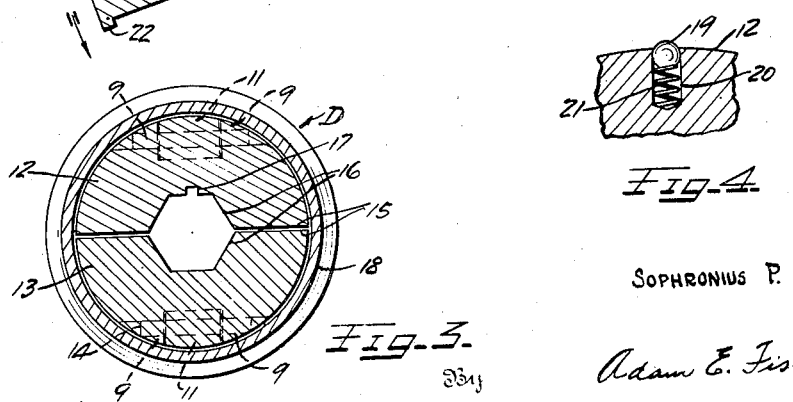
Inventor
SOPHRONIUS P. WAGONER
Adam E. Fisher
Attorney Patented June 8, 1943

2,321,533

UNITED STATES PATENT OFFICE 2,321,533

DRILL CHUCK

Sophronius P. Wagoner, Hutchinson, Kans.

Application September 17, 1941, Serial No. 411,138

2 Claims. (Cl. 279—37)

My invention relates to improvements in drill chucks or devices to hold a drill bit while it accomplishes its work.

The primary object of my invention is to provide a chuck designed particularly for use in connection with a mine drill to hold the auger-like bit used in such work, and which is adapted to be manipulated to receive or release the bit without the use of any tools, to thus effect a saving in manipulating time.

Another object is to provide a chuck of this kind in which the bit holding parts are so constructed and arranged that there is nothing to project in such manner as to possibly catch in the workman's clothes and cause him injury.

Still another object of the invention is to provide a drill chuck for this purpose which is extremely simple and inexpensive to manufacture, and durable in use.

With these and other objects in view the invention resides in the novel construction and arrangement of parts as hereinafter fully set forth and claimed, reference being had to the accompanying drawing wherein:

Figure 1 is a side elevation of my improved mine drill chuck showing the same as closed upon a length of mine drill bit.

Figure 2 is a longitudinal section through the chuck showing its jaw spread apart to release the bit.

Figure 3 is a cross section, taken along the line 3—3 in Figure 1, the drill bit being omitted.

Figure 4 is an enlarged fragmentary cross sectional detail, substantially along the line 4—4 in Figure 1.

The drill chuck constituting my invention is, as shown in the drawing designed for use in operatively holding the auger-like drill bit A which is of a well known type used in connection with mine drills marketed under the name "Howell" and which bits have the stock B of hexagonal cross section and the spiral conveyor or fin C. The bit is elongated and in use passes entirely through the chuck, designated generally at D, and through the thread bar E, which is tubular to pass the drill, and which is operated by the drill per se (not shown) to not only turn the bit about its axis but to feed it lengthwise to the work. No invention, of course, is herein claimed for details of the drill construction or operations.

Turning now to the construction of the chuck itself, it comprises a shank or mounting member 5 of rounded outside conformation having at one end an interiorly tapped socket 6 by which it is rigidly, but removably, secured to the end of the thread bar E, this end of the member having also a diametrically enlarged and angularly faced wrench grip 7 to facilitate such mounting. The socket 6 communicates with a smaller bore 8 which is adapted to clear the drill bit A which, as stated heretofore, extends not only through the chuck, but through the hollow thread bar also.

The opposite, or what may be termed the forward end, of the shank 5 has spaced hinge ears or lugs 9 at diametrically opposite points and which are provided with parallel hinge pin openings 10 which extend transversely to the axis of the chuck and bit on opposite sides thereof. Fitted between the pairs of such lugs 9 are the correspondingly apertured ends 11 of the two retaining jaws 12—13 which are pivotally mounted or hinged to the shank by pins 14. These jaws 12—13 are each half round in cross section so that when closed, as shown in Fig. 1, they will together form a smooth continuation of the shank 5, the hinge connections formed by the lugs and jaws ends also being smooth with the rounded exterior surface of the jaws and shank. The purpose of such construction will presently appear.

The meeting or facing surfaces 15 of the jaws 12—13 are provided with complementary grooves 16 which are longitudinally extended and each of three-sided shape, as viewed from the end, so that together they form a hexagonal channel to receive and non-rotatably engage the drill bit stock B. See Fig. 3. Said grooves 16 further have mating spiral flutes 17 which will receive the fin or conveyor C of the bit.

The jaws 12—13 when closed upon the bit A will obiviously anchor the bit to the chuck and thread bar in the required manner and the jaws may be held thus by the means now to be described. A cylindrical or annular collar or retaining ring 18 is provided and has an interior diameter such that it will nicely and slidably engage both the shank 5 and jaws. Obviously when this collar is moved forwardly over the jaws (Fig. 1) they will be positively held against spreading apart to clear the bit, and when the collar is moved back over the shank (Fig. 2) to clear the jaws they may be swung apart widely and the drill bit may be removed lengthwise from the chuck. The collar 18, once moved forward over the jaws, is held against accidental rearward movement clear of the jaws by retaining means or catches formed by balls 19 which are placed at diametrically opposite points in the jaws in radially extended sockets 20 and are urged outwardly by expansion coil springs 21 so that they project slightly but sufficiently to engage the collar. The collar may, of course, be easily forced past the balls 19 by hand but such movement by vibration of the chuck in operation is prevented. Diametrically enlarged flanges 22 on the ends of the jaws 12—13 prevent accidental displacement of the collar endwise off the chuck, and the wrench end 7 of the shank 5 serves a similar purpose. To afford a better grip the outer surface of the collar is curved as shown. The jaws 12—13 are normally urged apart by spring pressed plungers 23 which are slidably mounted in longitudinally extended passages 24 formed in the forward end of the shank 5 at each side of the bore 8. These plungers are normally urged endwise and forwardly, or toward the jaws, by expansion coil springs 25 in said passages 24, and the outer rounded ends of the plungers bear against the shouldered rear ends 26 of the jaws. The spring pressure exerted by the plungers tends to swing the jaws about the hinge pins 14 and will spread them as soon as the collar 18 is pulled back to clear, as will be apparent. Such swinging movement of the jaws may be limited by conventional shaping of the interfitting lugs 9 and jaw ends 11 forming the hinges for the jaws.

From the foregoing it will be apparent that I have provided a chuck into which the drill bit may be readily placed, or from which it may be removed, quickly and without the use of any tools whatsoever. Also it will be evident that there are no projecting parts such as to possibly become caught in the miner's clothing and cause injury. The chuck is furthermore very simple and durable.

I claim:

1. In combination with a suitable drill bit, a drill chuck comprising a shank having an enlarged socket in an end continued by a reduced bore to the other end thereof, a drill enclosing tube connected to said shank, pairs of opposed lugs secured to opposite sides of the shank, a pair of semi-circular drill bit gripping jaws each adapted to pivot between a pair of said lugs, spring means carried by said shank adapted to normally retain said jaws open, jaw closing means adapted to slide forward and close the jaws against the resistance of said spring means and clutch means in said jaws adapted to engage with said jaw closing means to retain said means in jaw closing position and thereby grip said suitable drill bit.

2. In a drill chuck for auger type drill bits comprising a shank having an enlarged socket in an end continued by a reduced bore to the other end thereof, a drill enclosing tube connected to said shank, pairs of opposed lugs secured to opposite sides of the shank, a pair of auger drill bit conforming gripping jaws semi-circular in cross-section having spiral grooves therein complementary to said auger drill ribs, lug members on each jaw section adapted to interfit with said shank lugs to form hinges, automatic jaw release means carried by the shank adapted to normally retain said jaws hinged open, manually operated jaw closing means adapted to slide over and cam said normally open jaws to closed position to hold an auger drill and clutch means in each jaw member adapted to maintain said jaw closing means stationary over the closed jaws.

SOPHRONIUS P. WAGONER.